United States Patent
Sawada et al.

(10) Patent No.: US 7,328,097 B2
(45) Date of Patent: *Feb. 5, 2008

(54) VEHICLE BEHAVIOR ESTIMATING DEVICE AND VEHICLE BEHAVIOR CONTROLLING DEVICE

(75) Inventors: Mamoru Sawada, Yokkaichi (JP); Toshiki Matsumoto, Kariya (JP); Tsutomu Tashiro, Nagoya (JP); Mamoru Mabuchi, Kariya (JP); Takehito Fujii, Anjo (JP)

(73) Assignee: DENSO Corporation, Kariya (JP)

( * ) Notice: Subject to any disclaimer, the term of this patent is extended or adjusted under 35 U.S.C. 154(b) by 431 days.

This patent is subject to a terminal disclaimer.

(21) Appl. No.: 10/983,807

(22) Filed: Nov. 8, 2004

(65) Prior Publication Data
US 2005/0102087 A1    May 12, 2005

(30) Foreign Application Priority Data
Nov. 10, 2003   (JP) .............................. 2003-380336

(51) Int. Cl.
*B60K 28/16* (2006.01)
(52) U.S. Cl. .................... 701/70; 701/82; 180/197
(58) Field of Classification Search ............. None
See application file for complete search history.

(56) References Cited

U.S. PATENT DOCUMENTS

| | | | |
|---|---|---|---|
| 5,137,105 A * | 8/1992 | Suzuki et al. ............... | 180/197 |
| 5,448,976 A * | 9/1995 | Treinies et al. ........ | 123/406.23 |
| 5,868,474 A | 2/1999 | Abe et al. | |
| 6,253,142 B1 | 6/2001 | Sauter et al. | |
| 6,412,886 B1 | 7/2002 | Abe et al. | |
| 7,113,863 B2 * | 9/2006 | Sawada et al. ............. | 701/111 |
| 2002/0045979 A1 | 4/2002 | Schmitt | |
| 2005/0119820 A1 * | 6/2005 | Sawada et al. ............. | 701/111 |

FOREIGN PATENT DOCUMENTS

| JP | 2002-78110 | 3/2002 |
|---|---|---|
| JP | 2002-211377 | 7/2002 |

* cited by examiner

*Primary Examiner*—Michael J. Zanelli
(74) *Attorney, Agent, or Firm*—Harness, Dickey & Pierce, PLC (57) ABSTRACT

While a driving torque TD outputted to a driving shaft via an AT from an engine is detected, a road-surface transmitting torque Td_tire is detected based on rotation speeds Vwdr, Vwdl of vehicle driving wheels, a vehicle body speed Vd, and driving torques Tdr, Tdl, all of which are previously detected. The driving torque TD and the road-surface transmitting torque Td_tire are then compared to each other. When TD>Td_tire, the driving torque from an engine is controlled so as to decrease a value of (TD−Td_tire). The vibrations of individual vehicle parts are thereby decreased.

20 Claims, 3 Drawing Sheets

VEHICLE BEHAVIOR ESTIMATING DEVICE AND VEHICLE BEHAVIOR CONTROLLING DEVICE

CROSS REFERENCE TO RELATED APPLICATIONS

This application is based on and incorporates herein by reference Japanese Patent Application No. 2003-380336 filed on Nov. 10, 2003.

FIELD OF THE INVENTION

The present invention relates to a vehicle behavior estimating device that is capable of estimating a vibration state of a vehicle at traveling, and a vehicle behavior controlling device that suppresses the vibration state with the vehicle behavior estimating device.

BACKGROUND OF THE INVENTION

Conventionally, for instance, as described in Patent document 1, it is known that there is a device that suppresses resonance by controlling a torque outputted to a shaft of a vehicle driving system when the vehicle driving system resonates.

The device previously possesses map data formed by specifying by experiments in which region of a vehicle speed, a torque command value, or the like a resonance takes place. The device then estimates whether the resonance takes place in the vehicle based on the map data. When a shaft (or axle) of a front-wheel driving system or rear-wheel driving system is estimated to be resonating, the device decreases a torque outputted to the one driving system that is estimated to be resonating. Further, the device simultaneously increases a torque outputted to the other driving system that is not estimated to be resonating. This varies a torque ratio between the torques to the front wheel and the rear wheel, to thereby suppress the resonance.

Patent Document 1: JP-2002-78110A

The invention described in Patent document 1 depends on a viewpoint that a vibration of a certain wheel or shaft is generated or varied by a driving force applied on the certain wheel or shaft. However, the vibration of the wheel or shaft has a close relationship with other parts, so that the vibration is sometimes generated by influence of the operations of the other parts. Namely, the vehicle body is disposed above the wheels via springs. The position of the vehicle body moves up and down, so that the springs expand and contract. This varies, of the wheels, grounding loads, i.e., forces that are upwardly and downwardly applied to the wheels, and thereby varies the rotational force of the wheels or shafts. The vibration is thereby generated.

In detail, accelerating of a vehicle generates such a phenomenon that the anterior portion of the vehicle relatively lifts up while the posterior portion of the vehicle falls down. Vice versa, decelerating of the vehicle generates such a phenomenon that the anterior portion of the vehicle falls down while the posterior portion of the vehicle lifts up. This varies the force affecting the individual wheels or shafts, resulting in generation of the vibration. Further, the variation of the force applied to the individual wheels or shafts vibrates the vehicle body, so that the shafts and vehicle body vibrate while affecting one another.

To prevent the vibration, for instance, it is possible that, after specifying individual relationships between the wheels (or shafts) and other parts of the vehicle, the driving force is adjusted based on the specified relationships. However, since the vehicle has a complicated structure, specifying of the entire relationships and subsequent compensating of them are very difficult. Therefore, it is preferable to adopt a different view that uniformly treats the causes generating the vibration and then execute compensation based on the view.

SUMMARY OF THE INVENTION

It is an object of the present invention to provide a technology that properly suppresses vibrations of individual parts of a vehicle by a simple process by uniformly treating causes generating the vibrations of the individual parts of the vehicle.

To achieve the above object, a vehicle behavior estimating device of the present invention is provided with the following. Driving torque detecting means detects a driving torque outputted to a driving shaft from driving force providing means that provides a vehicle with a driving force. Road-surface transmitting torque detecting means detects a road-surface transmitting torque transmitted to a road surface by driving wheels of the vehicle that are driven based on a driving torque transmitted from a driving shaft. Comparing means compares the thus detected driving torque and road-surface transmitting torque.

This driving torque reflects energy generated by the driving force providing means. The road-surface transmitting torque reflects energy that is a subset of the energy generated by the driving force providing means and effectively used in the vehicle-length directional movement, the vehicle-width directional movement, and the vehicle-rotational direction.

The difference between the driving torque and road-surface transmitting torque is energy that is undesirably consumed in the vibration or the like of the individual vehicle parts such as the vehicle body and the shafts (including driving wheels).

Therefore, when (an absolute value of) the difference between the driving torque and road-surface transmitting torque can be decreased (preferably cancelled), the energy undesirably consumed in the vibration of the vehicle parts becomes small (zero). This enables the phenomenon of the vibration to be suppressed.

In this invention, the comparing means compares the driving torque corresponding to the energy outputted to the driving shafts from the driving force providing means, and the road-surface transmitting torque corresponding to the energy that is effectively used in the vehicle-length directional movement, the vehicle-width directional movement, and the vehicle-rotational movement. Here, as explained above, the difference between both the torques corresponds to the energy that is consumed in the vibration of the vehicle parts.

Consequently, the present invention properly possibly evaluates a vibration state of the vehicle parts. Controlling of a vehicle state, e.g., adjusting of the driving torque from the driving force providing means based on the properly evaluated vibration state, results in proper suppression of the vibration of the vehicle parts.

In detail, the comparing means can determine whether the driving torque is greater than the road-surface transmitting torque. Here, when the driving torque is determined to be greater than the road-surface transmitting torque, it is estimated that the vibration of the vehicle parts takes place.

Further, the comparing means can compute a difference between the driving torque and road-surface transmitting torque. Here, since the resulting torque difference corresponds to the energy consumed in the vibration of the vehicle parts, a degree of the vibration of the vehicle parts can be quantitatively evaluated.

The vehicle behavior estimating device of the present invention can include driving-wheel rotation-speed detecting means that detects individual rotation speeds of vehicular driving wheels, driving wheel torque detecting means that detect individual driving-wheel torques outputted from driving wheels, and vehicle body speed detecting means that detects a vehicle body speed.

Further, in the present invention, as long as the road-surface transmitting torque detecting means can be constructed to detect a road-surface transmitting torque, it is not limited to a specific means. For instance, it can be constructed as follows.

Namely, the road-surface transmitting torque detecting means can estimate a road-surface transmitting torque by using rotation speeds of driving wheels detected by the driving-wheel rotation speed detecting means, driving-wheel torques by the driving-wheel torque detecting means, and a vehicle body speed detected by the vehicle body speed detecting means based on the following formula.

$$Td\_tire=(Tdr \times Vwdr+Tdl \times Vwdl)/Vd$$

Here, Td_tire: road-surface transmitting torque, Tdr: torque of right driving wheel, Vwdr: rotation speed of right driving wheel, Tdl: torque of left driving wheel, Vwdl: rotation speed of left driving wheel, Vd: and vehicle body speed.

The vehicle body speed detecting means is not limited to a specific means. When the vehicle is a front-wheel driving vehicle or a rear-wheel driving vehicle that includes trailing wheels, the vehicle body speed detecting means can be constructed as follows.

Namely, the vehicle behavior estimating device of the present invention includes trailing-wheel rotation-speed detecting means for detecting individual rotation speeds of trailing wheels of the vehicle. Further, the vehicle body speed detecting means is constructed to detect as a vehicle body speed an average for rotation speeds of the trailing wheels detected by the trailing-wheel rotation-speed detecting means. This enables a vehicle body speed detection value to be obtained properly.

Further, in the vehicle behavior estimating device of the present invention, the driving torque outputted to the driving shaft can be constructed to be outputted to the driving shaft via the transmission from the driving force providing means. Here, the driving torque detecting means is not limited to a specific means; however, it can be constructed as follows.

Namely, the vehicle behavior estimating device of the present invention includes output torque detecting means that detects an output torque from the driving force providing means, or transmission ratio detecting means that detects a transmission ratio of a transmission. Further, the driving torque detecting means is constructed to estimate a driving torque outputted to the driving shaft based on the detected output torque and transmission ratio of the transmission. This enables proper detection of the driving torque.

On the other hand, a vehicle behavior controlling device includes any one of the above-described vehicle behavior estimating device. Further, in the vehicle behavior controlling device, driving torque adjusting means adjusts a driving torque outputted to the driving shaft from the driving force providing means so that an absolute value of a difference between the driving torque detected by the driving torque detecting means and the road-surface transmitting torque detected by the road-surface transmitting torque detecting means becomes small.

Further, the vehicle behavior controlling device can include the above-described driving torque detecting means, the above-described road-surface transmitting torque detecting means, and driving torque adjusting means that adjusts a driving torque outputted to the driving shaft from the driving force providing means so that a difference between the driving torque detected by the driving torque detecting means and the road-surface transmitting torque detected by the road-surface transmitting torque detecting means becomes small.

According to thus constructed vehicle behavior controlling device of the present invention, the vibration of the vehicle parts can be properly suppressed. Namely, as explained above, the energy such as vibration of the vehicle parts that is undesirably consumed corresponds to an absolute value of a difference between a driving force detected by the driving torque detecting means and a road-surface transmitting torque detected by the road-surface transmitting torque detecting means.

In the vehicle behavior controlling means, the driving torque adjusting means adjusts a driving torque outputted to the driving shaft from the driving force providing means so that an absolute value of a difference between the driving torque detected by the driving torque detecting means and the road-surface transmitting torque detected by the road-surface transmitting torque detecting means becomes small. The energy consumed in the vibration of the vehicle parts is thereby decreased by an adjusted amount. Eventually, the vibration of the vehicle parts can be properly decreased.

In the vehicle behavior controlling device including the comparing means, it is preferable that the driving torque adjusting means adjusts a driving torque from the driving torque providing means so that an absolute value of a difference between a driving torque and a road-surface transmitting torque becomes small.

Namely, in a theory, the driving torque never becomes smaller than the road-surface transmitting torque. This is because the driving torque corresponds to energy outputted from the driving force providing means to the driving shaft while the road-surface transmitting torque corresponds to energy that is a subset of the energy outputted from the driving force providing means and effectively used in a vehicle-length directional movement, a vehicle-width directional movement, and a vehicle-rotational movement.

However, in practice, by detection errors in the driving torque and road-surface transmitting torque, the driving torque sometimes becomes smaller than the road-surface transmitting torque in their detection values. This takes place when the driving wheels undergo wheel spins, in a case where the road-surface transmitting torque Td_tire is detected as an equivalent to "Tdr×Vwdr+Tdl×Vwdl)/Vd." When the driving wheels undergo the wheel spins, the driving-wheel rotation speeds Vwdr, Vwdl are detected as remarkably large speeds that do not correspond to the vehicle body speed Vd, of the vehicle traveling speed. Further, the road-surface transmitting torque Td_tire is detected as a torque larger than an actual road-surface transmitting torque.

Therefore, from a viewpoint of properly suppressing the vibration of the vehicle parts, it is preferable to adopt the following procedure. Namely, the driving torque adjusting means adjusts a driving torque from the driving torque providing means so that an absolute value of a difference between a driving torque and a road-surface transmitting torque becomes small in their detection values, only when the driving torque or road-surface transmitting torque is relatively accurately detected, i.e., only when the comparing means determines that the driving torque is larger than the road-surface transmitting torque in their detection values.

In the vehicle behavior controlling device of the present invention, the driving torque adjusting means can be constructed so that the driving torque adjusting means detects a vehicle body acceleration and adjusts a driving torque from the driving force providing means based on the detected vehicle body acceleration.

In detail, for instance, the driving torque adjusting means determines whether the vehicle is in an accelerating state or in a decelerating state based on the detected vehicle body acceleration. When the driving torque adjusting means determines that the vehicle is in the accelerating state, the driving torque adjusting means decreases an absolute value of a difference between the driving torque and road-surface transmitting torque by decreasing a driving torque from the driving force providing means.

For instance, as described in "Problems to be Solved by the Invention," when a vehicle accelerates, such a vibration that the anterior portion of the vehicle lifts up, sometimes occurs. Here, when the driving torque from the driving force providing means is decreased to a degree that the absolute value of the difference between the driving torque and road-surface transmitting torque becomes small, the lifting amount of the anterior portion of the vehicle becomes small in comparison to that in a case where the driving torque is not decreased. Namely, the vibration of the vehicle parts can be properly suppressed.

Further, for instance, when the driving torque adjusting means determines that the vehicle is in the decelerating state based on the detected vehicle body acceleration, the driving torque adjusting means can decrease an absolute value of a difference between the driving torque and road-surface transmitting torque by increasing a driving torque from the driving force providing means.

For instance, as described in "Problems to be Solved by the Invention," when a vehicle decelerates, such a vibration that the posterior portion of the vehicle lifts up sometimes occurs. Here, when the driving torque from the driving force providing means is increased to a degree that the absolute value of the difference between the driving torque and road-surface transmitting torque becomes small, the lifting amount of the posterior portion of the vehicle becomes small in comparison to that in a case where the driving torque is not increased. Namely, the vibration of the vehicle parts can be also properly suppressed.

Furthermore, of any one of the above-described vehicle behavior estimating devices, the driving torque detecting means, the road-surface transmitting torque detecting means, and the comparing means can be achieved as a program causing a computer to function. Furthermore, of any one of the above-described vehicle behavior controlling devices, the driving torque detecting means, the road-surface transmitting torque detecting means, the comparing means, and driving torque adjusting means can be achieved as a program causing a computer to function. Furthermore, of any one of the above-described vehicle behavior controlling devices, the driving torque detecting means, the road-surface transmitting torque detecting means, and driving torque adjusting means can be achieved as a program causing a computer to function.

Each of the above programs can be stored in a computer readable storage medium such as a flexible disk, optical magnetic disk, CD-ROM, hard disk, ROM, RAM, or the like, and be used by being loaded to the computer and activated as needed.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinafter, an example which the present invention is directed to will be explained by using drawings. Here, an embodiment of the present invention is not limited to the example below, and can be modified into various embodiments as long as it falls within a technical region of the present invention.

Figure 1:
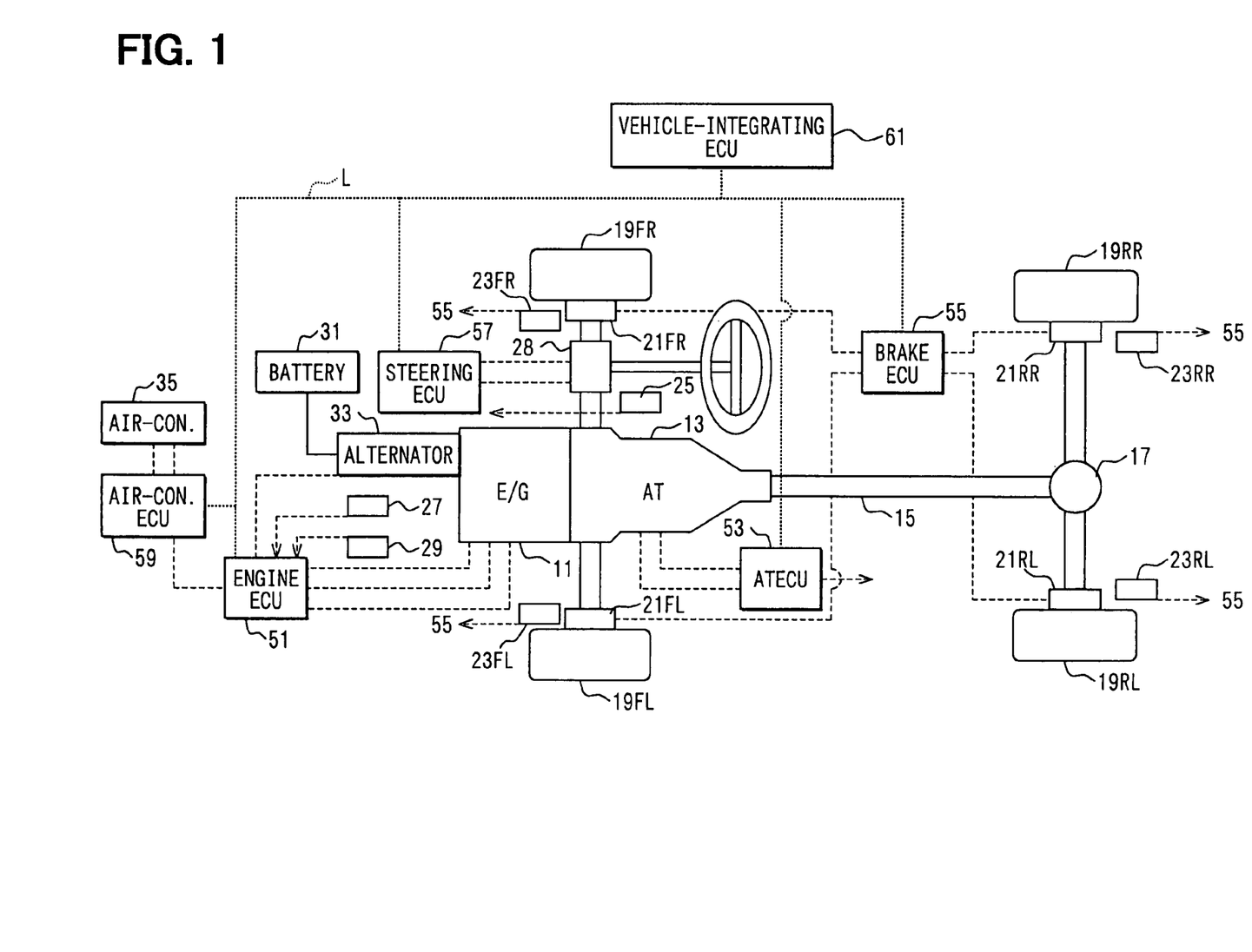
FIG. 1 shows a block diagram showing a structure of a vehicle behavior controlling device of an example.

FIG. 1 shows a block diagram showing a structure of a vehicle behavior controlling device of an example. In the example, a vehicle behavior estimating device and vehicle behavior controlling device of the present invention are adopted to a front-engine and rear-driving (FR) type vehicle.

As shown in FIG. 1, in this vehicle, an engine 11 (or internal combustion engine) as driving force providing means outputs an output torque as a driving torque to a driving shaft 15 via an automatic transmission 13 (multiple-step transmission, hereinafter referred to as AT) as a transmission. The driving torque outputted to the driving shaft 15 is divided into a left-rear wheel 19RL of a driving wheel and a right-rear wheel 19RR of a driving wheel via a differential gear 17 such as an LSD (Limited Slip Differential).

The wheels (a left-front wheel 19FL of a trailing wheel, a right-front wheel 19FR of a trailing wheel, the left-rear wheel 19RL, and right-rear wheel 19RR) of the vehicle are equipped with oil pressure type brake devices 21FL, 21FR, 21RL, 21RR that provide braking force to the wheels 19FL to 19RR, respectively.

The braking devices 21FL to 21RR are driven by control signals from a brake ECU 55 (to be explained later) corresponding to operation of a brake (not shown) by a driver or a process (refer to FIG. 3) at Step S190 to be explained later.

Further, the wheels 19FL to 19RR are equipped with wheel speed sensors 23FL, 23FR, 23RL, 23RR that detect rotation speeds of the wheels 19FL to 19RR, respectively. Of the sensors 23FL to 23RR, the wheel speed sensors 23RL, 23RR are equivalent to driving-wheel rotation-speed detecting means, while the wheel speed sensors 23FL, 23FR are equivalent to trailing-wheel rotation-speed detecting means.

The vehicle includes an engine ECU 51, an AT ECU 53, and a brake ECU 55 for controlling the engine 11, the AT 13, and the braking devices 21FL to 21RR, respectively. The vehicle further includes a steering ECU 57 and an air-conditioner ECU 59. The steering ECU 57 outputs a control signal to an actuator 28 that varies a steering angle of the trailing wheels 19FL, 19FR for steering the vehicle, based on a steering angle of the steering operation by the driver. The air-conditioner ECU 59 controls operation of the air conditioner 35.

Of the ECUs, the engine ECU 51 is constructed to retrieve detection signals from a suction air amount sensor 29 detecting a suction air amount to the engine 11 and an engine rotation number sensor 27 detecting a rotation number of the engine 11. The engine ECU 51 is further constructed to output a control signal to an alternator 33 charging an in-vehicle battery 31 by using a part of the output torque of the engine 11. The AT ECU 53 is constructed to retrieve a detection signal from a shift position switch (not shown) or the like detecting a shift position (operation position) of a shift lever operated by the driver. The brake ECU 55 is constructed to retrieve a detection signal from a master cylinder pressure sensor (not shown), each of the wheel speed sensors 23FL to 23RR, or the like. The master cylinder pressure sensor detects oil pressure of a master cylinder pressure-feeding brake oil according to a brake pedal operation by the driver.

The vehicle further includes a vehicle-integrating ECU 61 that sends operation instruction information to the above engine ECU 51, AT ECU 53, brake ECU 55, steering ECU 57, and air-conditioner ECU 59.

The vehicle-integrating ECU 61 integratively generates operation instruction information to the components of the vehicle based on various data (detection values or the like) specifying vehicle states that are inputted via a signal line L from the other ECUs 51, 53, 55, 57, 59 other than the vehicle-integrating ECU 61. The generated operation instruction information is sent out to the individual ECUs 51, 53, 55, 57, 59. The signal line L intermediates between the ECUs 51, 53, 55, 57, 59, 61 including the vehicle-integrating ECU 61 itself. This structure achieves proper control for the entire vehicle.

Each of the ECUs 51, 53, 55, 57, 59, 61 is constructed as an electronic control device primarily including a microcomputer having a structure accommodating a CPU, ROM, RAM etc.

Figure 2:
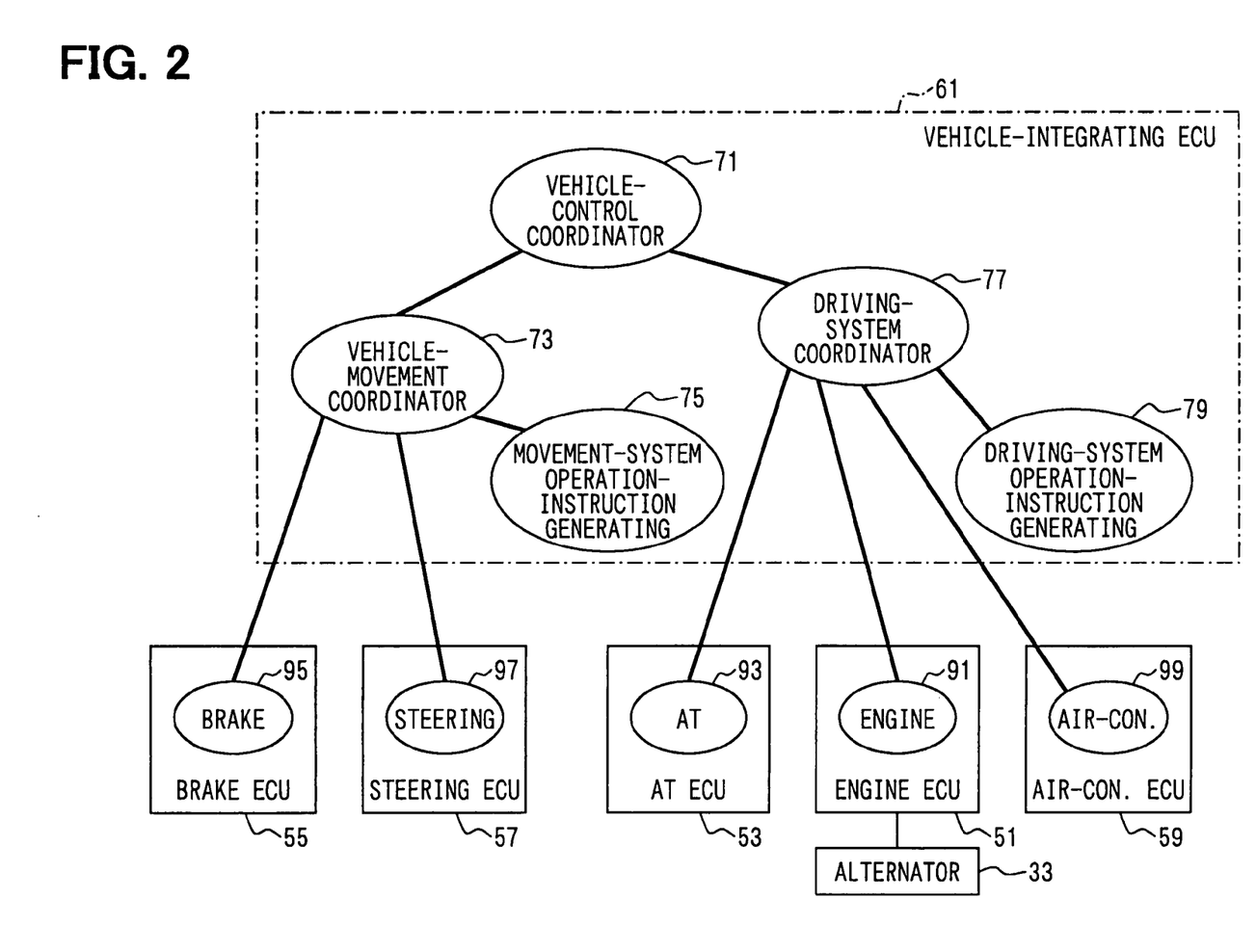
FIG. 2 is a functional block diagram showing control process executed in each of ECUs of the example.

Next, a control process executed in each of the ECUs 51, 53, 55, 57, 59, 61 will be explained below. FIG. 2 is a functional block diagram showing control process executed in each of the ECUs 51, 53, 55, 57, 59, 61. In this example, the vehicle-integrating ECU 61 includes a vehicle-control coordinator 71, a vehicle-movement coordinator 73, a movement-system operation-instruction generating unit 75, a driving-system coordinator 77, and a driving-system operation-instruction generating unit 79. Further, other than the vehicle-integrating ECU 61, the ECUs 51, 53, 55, 57, 59 include an engine control component 91, an AT control component 93, a brake control component 95, a steering control component 97, and an air-conditioner control component 99 for controlling the operations of the engine 11, the AT 13, the braking devices 21FL to 21RR, the actuator 28, and an air-conditioner 35, respectively.

In this structure, each of the components 91, 93, 95, 97, 99 detects information for vehicle control, and the detected information is then inputted to the vehicle-integrating ECU 61. The inputted information is shared by, of the internal components within the vehicle-integrating ECU 61, the relevant components that require the inputted information.

For instance, the information for vehicle control is sent out from each of the components to be inputted to the vehicle-integrating ECU 61 as follows. Firstly, the engine control component 91 computes an engine rotation number, a suction air amount based on detection signals from the engine rotation number sensor 27, and the suction air amount sensor 29, and retrieves information indicating an operating state of the alternator 33 from the alternator 33, then sending them to the vehicle-integrating ECU 61. The AT control component 93 computes a transmission ratio for the AT 13 based on a detection signal or the like from the shift-position switch, then sending it to the vehicle-integrating ECU 61. The brake control component 95 detects individual rotation speeds of the wheels 19FL to 19RR based on detection signals from the wheel speed sensors 23FI to 23RR, then sending them to the vehicle-integrating ECU 61. Further, the air-conditioner control component 99 retrieves information indicating an operating state of the air-conditioner 35 from the air-conditioner 35, then sending it to the vehicle-integrating ECU 61.

In the vehicle-integrating ECU 61, upon receiving the information from the components 91, 93, 95, 97, 99, the vehicle-control coordinator 71 executes cooperation control between the vehicle-movement coordinator 73 and the driving-system coordinator 77. The vehicle-movement coordinator 73 sends out operation instruction information to the relevant component of the brake control component 95 or steering control component 97 that is connected to the vehicle-movement coordinator 73, according to the instruction from the vehicle-control coordinator 71. Here, the sent operation instruction information is generated by the movement-system operation-instruction generating unit 75 according to the instruction from the vehicle-control coordinator 71. Further, similarly, the driving-system coordinator 77 sends out operation instruction information to the relevant component of the engine control component 91, AT control component 93, or air-conditioner control component 99 that is connected to the driving-system coordinator 77 according to the instruction information from the vehicle-control coordinator 71. Here, the sent operation instruction information is generated by the driving-system operation-instruction generating unit 79 according to the instruction from the vehicle control coordinator 71. Each of the components 91, 93, 95, 97, 99 controls a relevant control target according to the corresponding operation instruction information.

Next, a vehicle vibration suppression process will be explained below with reference to FIG. 3. The vehicle vibration suppression process is one of the control processes that the constituent CPU of the vehicle-integrating ECU 61 repeatedly executes during vehicle traveling based on programs stored in a ROM within the CPU.

Figure 3:
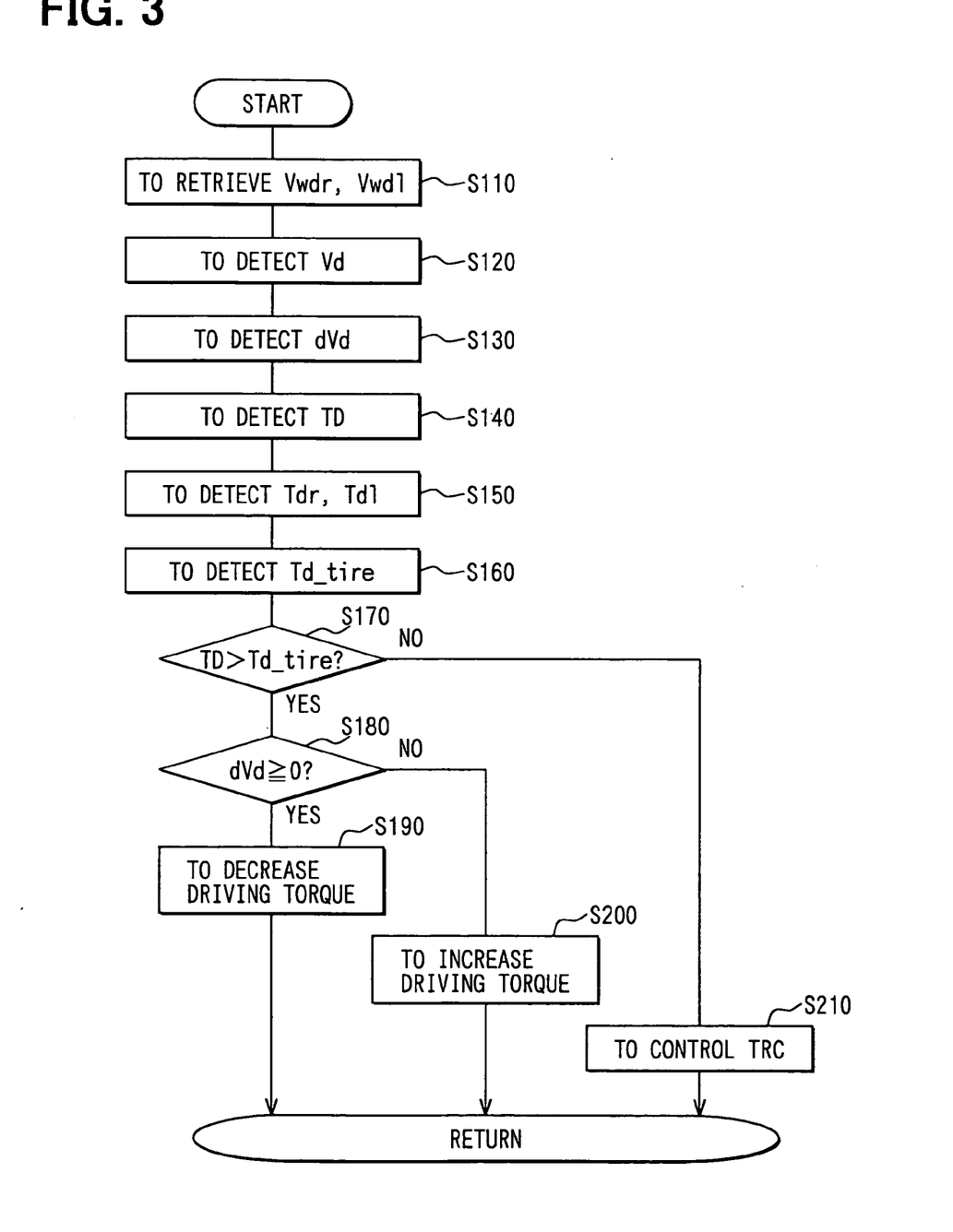
FIG. 3 is a flow chart diagram showing vehicle vibration suppression process of the example.

As shown in FIG. 3, as the process starts, at Step S110, a rotation speed Vwdr of the right driving wheel 19RR and a rotation speed Vwdl of the left driving wheel 19RL are retrieved from the brake ECU 55 (brake control component 95).

At Step S120, a vehicle body speed Vd being a vehicle traveling speed is detected. Here, for instance, a rotation speed Vwcr of the right trailing wheel 19FR and a rotation speed Vwcl of the left trailing wheel 19FL are retrieved and averaged to detect an average as a body speed Vd.

At Step S130, a vehicle acceleration dVd is detected, for instance, by applying a differential calculus to the vehicle body speed Vd detected at Step S120. At Step S140, a driving torque TD outputted to the driving shaft 15 via the AT 13 from the engine 11 is detected. This process is executed as follows.

Firstly, an engine rotation number and a suction air amount are retrieved from the engine ECU 51 (engine control component 91). Next, based on the retrieved engine rotation number and suction air amount, an output torque of the engine 11 is computed. The output torque is also called an engine output torque, and a torque inputted to an input shaft of the AT 13 from the engine 11. This computation can be done based on map data that is previously registered, for instance, in the ROM of the vehicle-integrating ECU 61 and indicates relationships among the engine rotation number, suction air amount, and engine output torque.

Next, a transmission ratio of the AT 13 is retrieved from the AT ECU 53 (AT control component 93). The driving torque TD is computed by multiplying the engine output torque by the transmission ratio.

At Step S150, a right driving wheel torque Tdr outputted from the right driving wheel 19RR and a left driving wheel torque Tdl outputted from the left driving wheel 19RL are computed based on the driving torque TD. The driving wheel torques Tdr, Tdl are individually computed by multiplying the driving torque TD by a previously set mechanical loss in consideration of the behavior of the differential gear 17.

At Step S160, a road-surface transmitting torque Td_tire that is a torque that the driving wheels 19RL, 19RR transmits to a road surface is detected correspondingly to the driving wheel torques Tdr, Tdl detected at Step S150. In this process, the road-surface transmitting torque Td_tire is based on a formula (1) using the rotation speeds Vwdr, Vwdl of the driving wheels 19RR, 19RL detected at Step S110, the vehicle body speed Vd detected at Step 120, and the driving-wheel torques Tdr, Tdl detected at Step S150.

$$Td\_tire = (Tdr \times Vwdr + Tdl \times Vwdl)/Vd \quad (1)$$

At Step S170, the driving torque TD obtained at Step S140 and the road-surface transmitting torque Td_tire obtained at Step S160 are compared to each other. In detail, it is determined whether the driving torque TD is larger than the road-surface transmitting torque Td_tire.

When the driving torque TD is determined to be larger than the road-surface transmitting torque Td_tire (Step S170: YES), the sequence advances to Step S180. By contrast, when the driving torque TD is determined to be not larger than the road-surface transmitting torque Td_tire (Step S170: NO), the sequence advances to Step S210. Here, when the affirmative determination is done at Step S170 (Step S170: YES), a torque difference $\Delta T(=TD-Td\_tire)$ between the driving torque TD and road-surface transmitting torque Td_tire can be computed before the sequence advances to Step S180. Otherwise, the torque difference $\Delta T$ can be computed at Step S190 or Step S200.

In this example, by comparing the driving torque TD and the road-surface transmitting torque Td_tire, the state of vibration of the vehicle parts can be properly estimated. The reason is as follows. With respect to energy outputted to the driving shaft 15 via the AT13 from the engine 11, a part of it is effectively used in the vehicle-longitudinal (or vehicle-length directional), vehicle-lateral (or vehicle-width directional), and vehicle-rotational movements; however, the remaining part of it is undesirably consumed in the vibration of the vehicle parts such as the vehicle body and shafts including the driving shaft 15.

Here, the energy outputted to the driving shaft 15 via the AT13 from the engine 11 corresponds to the driving torque TD, while the energy effectively used in the vehicle-longitudinal, vehicle-lateral, and vehicle-rotational movements corresponds to the the road-surface transmitting torque Td_tire. Consequently, the energy consumed for the vibration of the vehicle parts is estimated to be corresponding to the torque difference $\Delta T$ between the driving torque TD and the road-surface transmitting torque Td_tire.

Therefore, when it is determined that the driving torque TD is larger than the road-surface transmitting torque Td_tire by comparing the driving torque TD and the road-surface transmitting torque Td_tire, the vibration of the vehicle parts is estimated to be occurring. Further, as explained above, when the affirmative determination is done at Step S170 (Step S170: YES), the torque difference $\Delta T$ between the driving torque TD and the road-surface transmitting torque Td_tire is computed in addition to comparing them. Since the torque difference $\Delta T$ between the driving torque TD and the road-surface transmitting torque Td_tire corresponds to the energy consumed for the vibration of the vehicle parts, the degree of the vibration of the vehicle parts can be evaluated quantitatively.

Further, since the road-surface transmitting torque Td_tire is defined to the entire energy that is divided into the vehicle-longitudinal, vehicle-lateral, and vehicle-rotational movements, from the theory, the driving torque TD never becomes smaller than the road-surface transmitting torque Td_tire.

However, in practice, the detection error sometimes generates a phenomenon that the driving torque TD becomes smaller than the road-surface transmitting torque Td_tire. In this example, this phenomenon is produced when wheel spin occurs in the driving wheels 19RR, 19RL. In this case, at Step S110, the rotation speeds Vwdr, Vwdl of the driving wheels 19RR, 19RL are detected, because of the wheel spin, as remarkably large speeds that do not correspond to the vehicle body speed Vd detected at Step S120. It is because, based on the formula (1), the road-surface transmitting torque Td_tire is eventually detected as the remarkably large torque compared to the actual road-surface transmitting torque.

Therefore, in this example, according to the above knowledge, the subsequent process at Steps S190, S200 where the control processes based on the torque difference $\Delta T$ between the driving torque TD and the road-surface transmitting torque Td_tire are executed only when the driving torque TD and road-surface transmitting torque Td_tire are relatively accurately detected, i.e., when the driving torque TD is determined to be larger than the road-surface transmitting torque Td_tire.

Further, when the driving torque TD and the road-surface transmitting torque Td_tire become equal to each other, i.e., when the vibration of the vehicle parts is estimated to be properly suppressed, the torque difference $\Delta T$ becomes zero. Here, the determination at Step S170 can be affirmed, and then the sequence can advance to Step S190 or S200. However, as explained above, the processes at Steps S190, 200 are executed based on the torque difference $\Delta T$, so that no action will take place in Steps S190, S200. Therefore, in this embodiment, when the torque difference $\Delta T$ becomes zero, the determination at Step S170 is expediently negated (S170: NO), which advances the sequence to Step S210.

As the sequence advances to Step S180 after the affirmative determination at Step S170 (S170: YES), it is determined whether the vehicle is accelerating or not based on the vehicle body acceleration dVd obtained at Step S130. When the vehicle body acceleration dVd is zero or more, the vehicle is determined to be accelerating (S180: YES), the sequence advances to Step S190. When the vehicle body acceleration dVd is less than zero, the vehicle is determined to be decelerating (S180: NO), the sequence advances to Step S200.

At Step S190, a process that decreases the torque difference $\Delta T$ between the driving torque TD and the road-surface transmitting torque Td_tire is executed by decreasing the driving torque outputted from the engine 11 via the AT 13 to the driving shaft 15 (hereinafter, referred to as "driving torque from the engine 11," or simply "driving torque"). For instance, when the vehicle is accelerating, such vibration that lifts the anterior portion of the vehicle may take place. The energy consumed by this vibration corresponds to the torque difference ΔT, as explained above.

By executing, at Step S190, the process that decreases the driving torque outputted from the engine 11 so that the torque difference ΔT is decreased, the vibration of the vehicle parts is properly decreased.

Here, when the driving torque TD from the engine 11 is excessively decreased, the road-surface transmitting torque Td_tire decreases in conjunction with the driving torque TD. This may thereby adversely affect the accelerating performance of the vehicle. Therefore, it is preferable that the driving torque TD is properly decreased at Step S190 to a degree that the torque difference ΔT is decreased while the road-surface transmitting torque Td_tire does not decrease in conjunction with the driving torque TD.

In practice, to prevent the road-surface transmitting torque Td_tire from decreasing in conjunction with the driving torque TD as much as possible, the decreasing amount of the driving torque at Step S190 is preferably set, for instance, to "α(TD−T_tire)=α×ΔT" (α is a coefficient previously set according to the vehicle).

The practical process at Step S190 where the driving torque TD is decreased can be executed in various manners. In this example, the practical process is executed, for instance, in a priority order that is previously set according to the torque difference ΔT, information inputted to the vehicle-integrating ECU 61 from the ECUs 51, 53, 55, 57, 59 excluding the vehicle-integrating ECU 61 (components 91, 93, 95, 97, 99), or any one of candidate processes.

In detail, for instance, suppose that operating state information that electric power is not generated by the alternator 33 or that electric power is relatively scarcely generated by the alternator 33 is inputted from the engine ECU 51 (engine control component 91). Here, operation instruction information that a generation amount by the alternator 33 should be increased than the present amount according to the operating state of the battery 31 can be sent to the engine ECU 51.

Further, for instance, suppose that operating state information that the air-conditioner 35 is in the ON state is inputted from the air-conditioner ECU 59 (air-conditioner control component 99). Here, operation instruction information that should cause the air-conditioner 35 to increase output can be sent to the air-conditioner ECU 59.

Further, for instance, operation instruction information that should cause the brake devices 21FL to 21FR to increase braking force to the wheel 19FL to 19RR, respectively, can be sent to the brake ECU 55 (brake control component 95).

Thus, when the alternator 33, air-conditioner 35, or brake devices 21FL to 21RR are operated based on the operation instruction information, the load to the engine 11 increases and the torque from the engine 11 thereby decreases.

By contrast, at Step S190, a process that decreases the torque difference ΔT is executed by increasing the driving torque outputted from the engine 11. For instance, when the vehicle is decelerating, such vibration that lifts the posterior portion of the vehicle may take place. The energy consumed by this vibration also corresponds to the torque difference ΔT, as explained above.

By executing, at Step S200, the process that increases the driving torque outputted from the engine 11 so that the torque difference ΔT is decreased, the vibration of the vehicle parts is properly decreased.

Here, when the driving torque TD from the engine 11 is excessively increased, the road-surface transmitting torque Td_tire increases in conjunction with the driving torque TD. This may thereby adversely affect the decelerating performance of the vehicle. Therefore, the driving torque TD is properly increased at Step S200 to a degree that the torque difference ΔT is decreased while the road-surface transmitting torque Td_tire does not increase in conjunction with the driving torque TD.

In practice, to prevent the road-surface transmitting torque Td_tire from increasing in conjunction with the driving torque TD as much as possible, the increasing amount of the driving torque at Step S200 is preferably set, for instance, to "β(TD−T_tire)=β×ΔT" (β is a coefficient previously set according to the vehicle).

The practical process at Step S200 where the driving torque TD is increased can be executed in various manners. In this example, the practical process is also executed, for instance, in a priority order that is previously set according to the torque difference ΔT, information inputted to the vehicle-integrating ECU 61 from the ECUs 51, 53, 55, 57, 59 excluding the vehicle-integrating ECU 61 (components 91, 93, 95, 97, 99), or any one of candidate processes.

In detail, for instance, suppose that operating state information that electric power is generated by the alternator 33 is inputted from the engine ECU 51. Here, operation instruction information that a generation amount by the alternator 33 should be decreased than the present amount according to the operating state of the battery 31 can be sent to the engine ECU 51.

Further, for instance, suppose that operating state information that the air-conditioner 35 is in the ON state is inputted from the air-conditioner ECU 59 (air-conditioner control component 99). Here, operation instruction information that should cause the air-conditioner 35 to decrease output can be sent to the air-conditioner ECU 59.

Thus, when the alternator 33, air-conditioner 35, or the like is operated based on the operation instruction information, the load to the engine 11 decreases than up to then and the driving torque TD thereby increases.

As the sequence advances to Step S210 after the negative determination at Step S170 (S170: NO), a traction control (TRC) is executed for preventing slip as needed. It is because the driving wheels 19RR, 19RL may undergo the wheel spin when the driving torque TD becomes smaller than the road-surface transmitting torque Td_tire.

After any one of Steps S190, S200, S210 is executed, the vehicle vibration suppression process is once terminated, then repeating to Step S110.

Here, in the above example, the AT 13 is explained as a multiple-step transmission; however, it can be a CVT (Continuously Variable Transmission). In this case, a smoothly variable control for the driving torque can be possible, so that the torque difference ΔT can be decreased by sending to the AT ECU 53 operation instruction information that varies a transmission ratio of the CVT at Steps S190, S200.

In detail, at Step S190, the driving torque from the engine 11 can be decreased by sending to the AT ECU 53 operation instruction information that decreases the transmission ratio of the CVT (to a high speed ratio) at Step S190. Further, at Step S200, the driving torque from the engine 11 can be increased by sending to the AT ECU 53 operation instruction information that decreases the transmission ratio of the CVT at Step S200.

Further, at Steps S190, S200, the torque difference ΔT can be decreased by sending to the engine ECU 51 operation instruction information that varies the suction air amount and fuel feeding amount to the engine 11.

Further, in the above example, the present invention is explained regarding a case where the present invention is adopted to an FR type vehicle; however, the present invention can be directed to other types such as an FF type, an RR type, and a MR type, which also exhibit the same effects as those in the FR type.

Further, in the above example, the ECU is divided, on a hardware basis, into the engine ECU 51, AT ECU 53, brake ECU 55, steering ECU 57, air-conditioner ECU 59, and vehicle-integrating ECU 61; however, it can be formed as another structure.

Further, in the above example, Step S170 where the driving torque TD and the road-surface transmitting torque Td_tire are compared to each other is included; however, it can be eliminated, instead.

It will be obvious to those skilled in the art that various changes may be made in the above-described embodiments of the present invention. However, the scope of the present invention should be determined by the following claims.

What is claimed is:

1. A vehicle behavior estimating device comprising:
    driving torque detecting means for detecting a driving torque outputted to a driving shaft from driving force providing means for providing a vehicle with a driving force;
    road-surface transmitting torque detecting means for detecting a road-surface transmitting torque transmitted to a road surface by driving wheels of the vehicle that are driven based on the driving torque transmitted from the driving shaft;
    driving-wheel rotation speed detecting means for detecting a rotation speed of the left driving wheel and a rotation speed of the right driving wheel, respectively;
    driving-wheel torque detecting means for detecting a left driving-wheel torque and a right driving-wheel torque, respectively; and
    vehicle body speed detecting means for detecting a vehicle body speed,
    wherein the road-surface transmitting torque detecting means estimates the road-surface transmitting torque based on a formula:

$Td\_tire=(Tdr \times Vwdr + Tdl \times Vwdl)/Vd,$ wherein Td_tire is the road-surface transmitting torque, Tdr is the torque of right driving wheel, Vwdr is the rotation speed of right driving wheel, Tdl is the torque of left driving wheel, Vwdl is the rotation speed of left driving wheel, and Vd is the vehicle body speed.

2. The vehicle behavior estimating device of claim 1, further comprising:
    trailing-wheel rotation-speed detecting means for detecting rotation speeds of trailing wheels of the vehicle, respectively,
    wherein the vehicle body speed detecting means detects as the vehicle body speed an average for the rotation speeds of the trailing wheels detected by the trailing-wheel rotation-speed detecting means.

3. The vehicle behavior estimating device of claim 1,
    wherein the driving torque outputted to the driving shaft is constructed so that the driving torque is outputted to the driving shaft via a transmission from the driving force providing means,
    the vehicle behavior estimating device further comprising:
    output torque detecting means for detecting an output torque from the driving force providing means; and
    transmission ratio detecting means for detecting a transmission ratio of the transmission,
    wherein the driving torque detecting means is constructed so that the driving torque detecting means estimates the driving torque outputted to the driving shaft based on the detected output torque and the detected transmission ratio of the transmission.

4. The vehicle behavior estimating device of claim 1, further comprising:
    comparing means for comparing the detected driving torque and the detected road-surface transmitting torque.

5. The vehicle behavior estimating device of claim 4,
    wherein the driving torque adjusting means adjusts the driving torque outputted to the driving shaft from the driving force providing means so that an absolute value of a difference between the detected driving torque and the detected road-surface transmitting torque becomes small, when the comparing means determines that the driving torque is larger than the road-surface transmitting torque.

6. The vehicle behavior estimating device of claim 1, further comprising:
    driving torque adjusting means for adjusting the driving torque outputted to the driving shaft from the driving force providing means so that an absolute value of a difference between the detected driving torque and the detected road- surface transmitting torque becomes small.

7. The vehicle behavior estimating device of claim 6,
    wherein the driving torque adjusting means is constructed so that the driving torque adjusting means detects a vehicle body acceleration and adjusts the driving torque from the driving force providing means based on the detected vehicle body acceleration.

8. The vehicle behavior estimating device of claim 7,
    wherein the driving torque adjusting means determines whether the vehicle is in an accelerating state or in a decelerating state based on the detected vehicle body acceleration,
    wherein, when the driving torque adjusting means determines that the vehicle is in the accelerating state, the driving torque adjusting means decreases the absolute value of the difference between the driving torque and the road-surface transmitting torque by decreasing the driving torque from the driving force providing means,
    wherein, when the driving torque adjusting means determines that the vehicle is in the decelerating state based on the detected vehicle body acceleration, the driving torque adjusting means decreases the absolute value of the difference between the driving torque and the road-surface transmitting torque by increasing the driving torque from the driving force providing means.

9. The vehicle behavior estimating device of claim 6, wherein
    the driving torque adjusting means adjusts the driving torque by adjusting at least one of
    (i) a generation amount by an alternator,
    (ii) an output by an air-conditioner, and
    (iii) a braking force to a wheel by a brake device.

10. A vehicle behavior controlling device comprising:
    driving torque detecting means for detecting a driving torque outputted to a driving shaft from driving force providing means for providing a vehicle with a driving force;
    road-surface transmitting torque detecting means for detecting a road-surface transmitting torque transmitted to a road surface by driving wheels of the vehicle that are driving based on the driving torque transmitted from the driving shaft; and driving torque adjusting means for adjusting the driving torque outputted to the driving shaft from the driving force providing means so that an absolute value of a difference between the detected driving torque and the detected road-surface transmitting torque becomes small, and for detecting a vehicle body acceleration and adjusting the driving torque from the driving force providing means based on the detected vehicle body acceleration, wherein the driving torque adjusting means determines whether the vehicle is in an accelerating state or in a decelerating state based on the detected vehicle body acceleration, wherein, when the driving torque adjusting means determines that the vehicle is in the accelerating state, the driving torque adjusting means decreases the absolute value of the difference between the driving torque and the road-surface transmitting torque by decreasing the driving torque from the driving force providing means, wherein, when the driving torque adjusting means determines that the vehicle is in the decelerating state based on the detected vehicle body acceleration, the driving torque adjusting means decreases the absolute value of the difference between the driving torque and the road-surface transmitting torque by increasing the driving torque from the driving force providing means.

11. The vehicle behavior controlling device of claim 10, further comprising:
    comparing means that compares the detected driving torque and the detected road-surface transmitting torque.

12. The vehicle behavior controlling device of claim 11, wherein the driving torque adjusting means adjusts the driving torque outputted to the driving shaft from the driving force providing means so that an absolute value of a difference between the detected driving torque and the detected road-surface transmitting torque becomes small, when the comparing means determines that the driving torque is larger than the road-surface transmitting torque.

13. The vehicle behavior controlling device of claim 10, further comprising:
    driving-wheel rotation speed detecting means for detecting a rotation speed of the left driving wheel and a rotation speed of the right driving wheel, respectively;
    driving-wheel torque detecting means for detecting a left driving-wheel torque and a right driving-wheel torque, respectively; and
    vehicle body speed detecting means for detecting a vehicle body speed,
    wherein the road-surface transmitting torque detecting means estimates the road-surface transmitting torque based on a formula:

$$Td\_tire=(Tdr \times Vwdr+Tdl \times Vwdl)/Vd,$$

wherein Td_tire is the road-surface transmitting torque, Tdr is the torque of right driving wheel, Vwdr is the rotation speed of right driving wheel, Tdl is the torque of left driving wheel, Vwdl is the rotation speed of left driving wheel, and Vd is the vehicle body speed.

14. The vehicle behavior controlling device of claim 13, further comprising:
    trailing-wheel rotation-speed detecting means for detecting rotation speeds of trailing wheels of the vehicle, respectively,
    wherein the vehicle body speed detecting means detects as the vehicle body speed an average for the rotation speeds of the trailing wheels detected by the trailing-wheel rotation-speed detecting means.

15. The vehicle behavior controlling device of claim 10, wherein the driving torque outputted to the driving shaft is constructed so that the driving torque is outputted to the driving shaft via a transmission from the driving force providing means,
    the vehicle behavior controlling device further comprising:
    output torque detecting means for detecting an output torque from the driving force providing means; and
    transmission ratio detecting means for detecting a transmission ratio of the transmission,
    wherein the driving torque detecting means is constructed so that the driving torque detecting means estimates the driving torque outputted to the driving shaft based on the detected output torque and the detected transmission ratio of the transmission.

16. The vehicle behavior controlling device of claim 10, wherein
    the driving torque adjusting means adjusts the driving torque by adjusting at least one of
    (i) a generation amount by an alternator,
    (ii) an output by an air-conditioner, and
    (iii) a braking force to a wheel by a brake device.

17. A method used in a vehicle behavior estimating device, the method comprising:
    detecting a driving torque outputted to a driving shaft from driving force providing means that provides a vehicle with a driving force;
    detecting a road-surface transmitting torque transmitted to a road surface by driving wheels of the vehicle that are driven based on the driving torque transmitted from the driving shaft;
    detecting a rotation speed of the left driving wheel and a rotation speed of the right driving wheel, respectively;
    detecting a left driving-wheel torque and a right driving-wheel torque, respectively; and
    detecting a vehicle body speed,
    wherein the road-surface transmitting torque is estimated based on a formula:

$$Td\_tire=(Tdr \times Vwdr+Tdl \times Vwdl)/Vd,$$

wherein Td_tire is the road-surface transmitting torque, Tdr is the torque of right driving wheel, Vwdr is the rotation speed of right driving wheel, Tdl is the torque of left driving wheel, Vwdl is the rotation speed of left driving wheel, and Vd is the vehicle body speed.

18. A method used in a vehicle behavior controlling device, the method comprising:
    detecting a driving torque outputted to a driving shaft from driving force providing means that provides a vehicle with a driving force;
    detecting a road-surface transmitting torque transmitted to a road surface by driving wheels of the vehicle that are driven based on the driving torque transmitted from the driving shaft; and
    adjusting the driving torque outputted to the driving shaft from the driving force providing means so that an absolute value of a difference between the detected driving torque and the detected road-surface transmitting torque becomes small, wherein a vehicle body acceleration is detected and the driving torque from the driving force providing means is adjusted based on the detected vehicle body acceleration, wherein, at the step of adjusting the driving torque, whether the vehicle is in an accelerating state or in a decelerating state is determined based on the detected vehicle body acceleration, wherein, when it is determined that the vehicle is in the accelerating state, the absolute value of the difference between the driving torque and the road-surface transmitting torque is decreased by decreasing the driving torque from the driving force providing means, and wherein, when it is determined that the vehicle is in the decelerating state based on the detected vehicle body acceleration, the absolute value of the difference between the driving torque and the road-surface transmitting torque is decreased by increasing the driving torque from the driving force providing means.

19. A computer program product in a computer readable medium for use in a data processing system for estimating a vehicle behavior, the computer program product comprising instructions for:

detecting a driving torque outputted to a driving shaft from driving force providing means that provides a vehicle with a driving force;

detecting a road-surface transmitting torque transmitted to a road surface by driving wheels of the vehicle that are driven based on the driving torque transmitted from the driving shaft;

detecting a rotation speed of the left driving wheel and a rotation speed of the right driving wheel, respectively;

detecting a left driving-wheel torque and a right driving-wheel torque, respectively; and detecting a vehicle body speed, wherein the road-surface transmitting torque is estimated based on a formula:

$$Td\_tire = (Tdr \times Vwdr + Tdl \times Vwdl)/Vd,$$

wherein $Td\_tire$ is the road-surface transmitting torque, $Tdr$ is the torque of right driving wheel, $Vwdr$ is the rotation speed of right driving wheel, $Tdl$ is the torque of left driving wheel, $Vwdl$ is the rotation speed of left driving wheel, and $Vd$ is the vehicle body speed.

20. A computer program product in a computer readable medium for use in a data processing system for controlling a vehicle behavior, the computer program product comprising instructions for:

detecting a driving torque outputted to a driving shaft from driving force providing means that provides a vehicle with a driving force;

detecting a road-surface transmitting torque transmitted to a road surface by driving wheels of the vehicle that are driven based on the driving torque transmitted from the driving shaft; and adjusting the driving torque outputted to the driving shaft from the driving force providing means so that an absolute value of a difference between the detected driving torque and the detected road-surface transmitting torque becomes small, wherein a vehicle body acceleration is detected and the driving torque from the driving force providing means is adjusted based on the detected vehicle body acceleration, wherein, in the instructions for adjusting the driving torque, whether the vehicle is in an accelerating state or in a decelerating state is determined based on the detected vehicle body acceleration, wherein, when it is determined that the vehicle is in the accelerating state, the absolute value of the difference between the driving torque and the road-surface transmitting torque is decreased by decreasing the driving torque from the driving force providing means, and wherein, when it is determined that the vehicle is in the decelerating state based on the detected vehicle body acceleration, the absolute value of the difference between the driving torque and the road-surface transmitting torque is decreased by increasing the driving torque from the driving force providing means.

* * * * *